United States Patent
Shen

(10) Patent No.: US 9,001,285 B2
(45) Date of Patent: Apr. 7, 2015

(54) ELECTRONIC DEVICE AND DISPLAY PANEL THEREOF

(71) Applicant: HTC Corporation, Taoyuan County (TW)

(72) Inventor: Weng-Chang Shen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 306 days.

(21) Appl. No.: 13/746,318

(22) Filed: Jan. 22, 2013

(65) Prior Publication Data

US 2014/0204302 A1 Jul. 24, 2014

(51) Int. Cl.
G02F 1/136 (2006.01)
G02F 1/1345 (2006.01)

(52) U.S. Cl.
CPC ................ G02F 1/13454 (2013.01)

(58) Field of Classification Search
USPC ...................................... 349/43, 46
See application file for complete search history.

(56) References Cited

U.S. PATENT DOCUMENTS

| 6,683,660 B1 * | 1/2004 | Wu et al. ................ 349/43 |
| 8,421,793 B2 * | 4/2013 | Chen et al. ............. 345/214 |
| 2013/0300966 A1 * | 11/2013 | Jin et al. ................ 349/43 |

* cited by examiner

Primary Examiner — Huyen Ngo
(74) Attorney, Agent, or Firm — Jianq Chyun IP Office

(57) ABSTRACT

An electronic device comprises a housing and a display panel installed in the housing. The display panel comprises a first substrate, a second substrate disposed opposite to the first substrate and a display medium disposed between the first substrate and the second substrate. The first substrate comprises a first substrate body, pixel units arranged in an array on the first substrate body, data lines disposed on the first substrate body and electrically connected to the pixel units, a first insulation layer and scan lines disposed on the first substrate body and electrically connected to the pixel units. Each of the scan lines has a first part and a second part connecting to the first part. The first parts of the scan lines are interlaced with the data lines. The second parts of the scan lines are substantially overlapped with the data lines with the first insulation layer disposed therebetween.

14 Claims, 3 Drawing Sheets

ELECTRONIC DEVICE AND DISPLAY PANEL THEREOF

TECHNICAL FIELD

The invention relates to an electronic device, more particularly to an electronic device having a display panel with slim borders.

BACKGROUND

Displays have been widely used in many different electronic devices, such as a television (TV), a computer screen, a notebook computer and a mobile phone. Taking the notebook computer as an example, consumers have an increasing demand for an aesthetic feeling of the appearance of the display apart from the demands for the displaying performance of the display, such as the resolution, contrast and viewing angle. Therefore, more and more manufacturers associated in the display field contribute to a slim border design, to make a display having light weight and thin volume with the same display quality, thereby satisfying the demands of the consumers. Among multiple flat-panel displays in the market, a thin film transistor liquid crystal display (TFT LCD) advantageous in high picture quality, good space utilization rate and low power consumption has already been widely used. The slim border design of the liquid crystal display is one of the study focuses of the manufacturers associated in this field.

A TFT LCD panel is mainly formed by a first substrate, a second substrate, and a liquid crystal layer located between the first substrate and the second substrate. The first substrate includes a substrate body, a plurality of scan lines, a plurality of data lines, a plurality of pixel units, and a driver integrated circuit (IC). The substrate body has a display area and a non-display area located on the periphery of the display area. The scan lines and the data lines are interlaced in the display area, and the pixel unites are connected to the scan lines and the data lines. The driver IC is located in the non-display area of the substrate.

The scan lines and the data lines may be electrically connected to the driver IC through peripheral wires in the non-display area. With an increased resolution, sufficient space needs to be provided on the periphery of the display area for the configuration of the layout of the numerous peripheral wires. Therefore, in order to achieve the slim border design, it is proposed to make an improvement on the design of the peripheral wires in the prior art. However, the current design cannot make all display panels have a slim border.

SUMMARY

An exemplary embodiment of the disclosure provides an electronic device having a display panel with slim borders.

An exemplary embodiment of the disclosure provides an electronic device. The electronic device comprises a housing and a display panel installed in the housing. The display panel comprises a first substrate, a second substrate disposed opposite to the first substrate and a display medium disposed between the first substrate and the second substrate. The first substrate comprises a first substrate body, a plurality of pixel units arranged in an array on the first substrate body, a plurality of data lines disposed on the first substrate body and electrically connected to the pixel units, a first insulation layer and a plurality of scan lines disposed on the first substrate body and electrically connected to the pixel units. Each of the scan lines has a first part and a second part connecting to the first part. The first parts of the scan lines are interlaced with the data lines. The second parts of the scan lines are substantially overlapped with the data lines with the first insulation layer disposed therebetween.

According to the electronic device of one embodiment of the disclosure, the display panel further comprises an adhesive pattern. The display medium and the pixel units are surrounded by the adhesive pattern between the first substrate and the second substrate. The adhesive pattern has a first segment, a second segment disposed opposite to the first segment, a third segment connecting the first segment to the second segment, and a fourth segment disposed opposite to the third segment and connecting the first segment to the second segment. The first substrate body has a first edge adjacent to the first segment, a second edge adjacent to the second segment, a third edge adjacent to the third segment, and a fourth edge adjacent to the fourth segment. The first substrate body has an active area surrounded by the adhesive pattern, a first peripheral area defined by the first segment of the adhesive pattern and the first edge of the first substrate body, a second peripheral area defined by the second segment of the adhesive pattern and the second edge of the first substrate body, a third peripheral area defined by the third segment of the adhesive pattern and the third edge of the first substrate body, and a fourth peripheral area defined by the fourth segment of the adhesive pattern and the fourth edge of the first substrate body.

In one embodiment of the disclosure, the electronic device further comprises a driving unit outside the adhesive pattern and electrically connected to the data lines and the scan lines for driving the plurality of pixel units. The second parts of the scan lines extend through the second segment of the adhesive pattern from the active area to the second peripheral area for being electrically connected to the driving unit.

The invention and certain merits provided by the invention can be better understood by way of the following exemplary embodiments and the accompanying drawings, which are not to be construed as limiting the scope of the invention.

DETAILED DESCRIPTION OF DISCLOSED EMBODIMENTS

Figure 1:
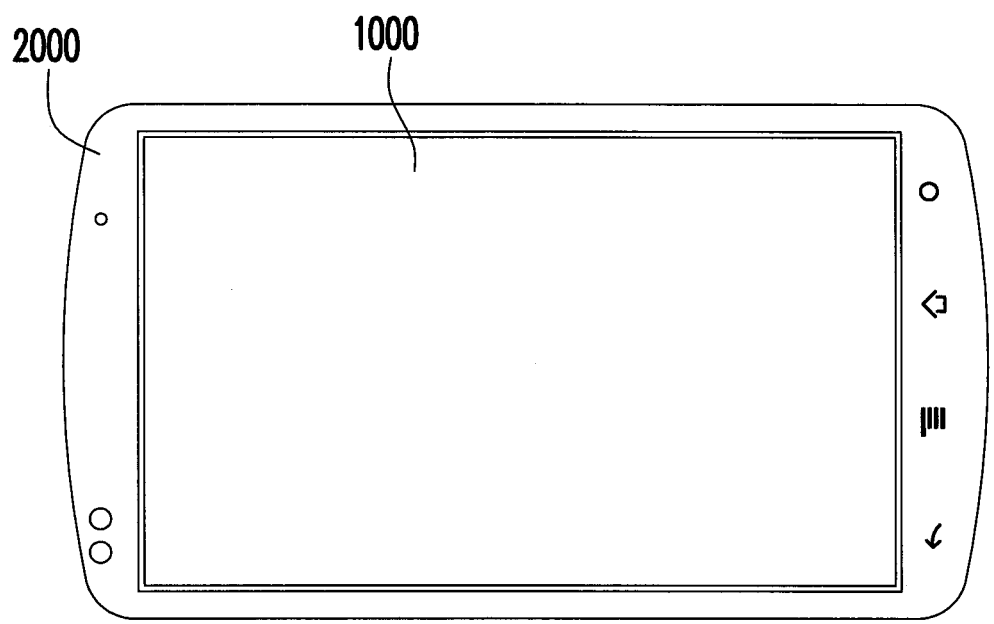
FIG. 1 is a schematic view of an electronic device according to an embodiment of the disclosure.
Figure 2:
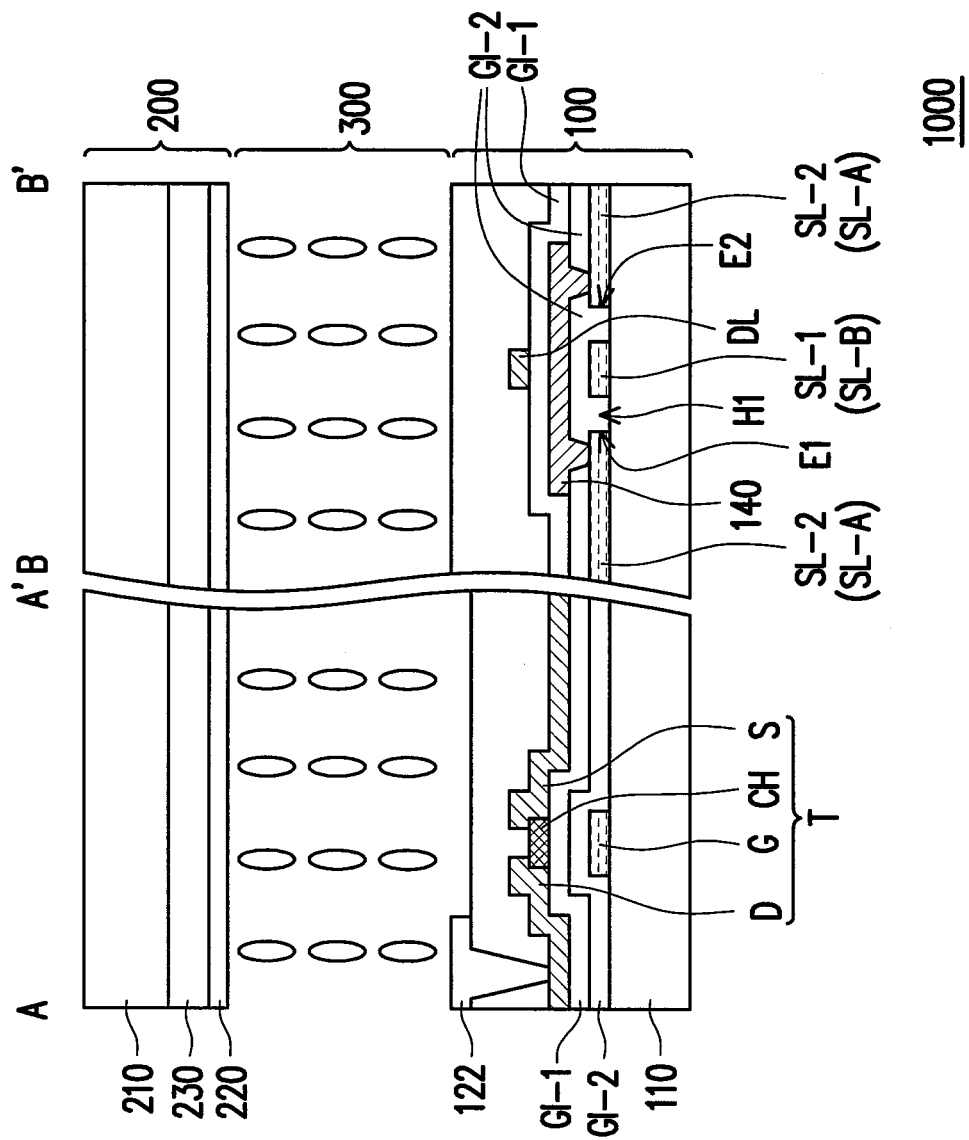
FIG. 2 is a partially cross-sectional view of a display panel shown in FIG. 1.

FIG. 1 is a schematic view of an electronic device according to an embodiment of the disclosure. Referring to FIG. 1, an electronic device 10000 includes a display panel 1000 and a housing 2000. The display panel 1000 is installed in the housing 2000. The electronic device 1000 may be a PDA, a mobile phone, a smart phone, a tablet PC, or any electronic device with a display panel 1000. FIG. 2 is a partially cross-sectional view of the display panel shown in FIG. 1. Referring to FIG. 1 and FIG. 2, the display panel 1000 of the present embodiment includes a first substrate 100, a second substrate 200 disposed opposite to the first substrate 100, and a display medium 300 disposed between the first substrate 100 and the second substrate 200. In the present embodiment, the display medium 300 may be a liquid crystal layer. However, the disclosure is not limited thereto. In other embodiments, the display medium 300 also may be an electroluminescent layer, an electrophoresis layer or other suitable material layer.

Figure 3:
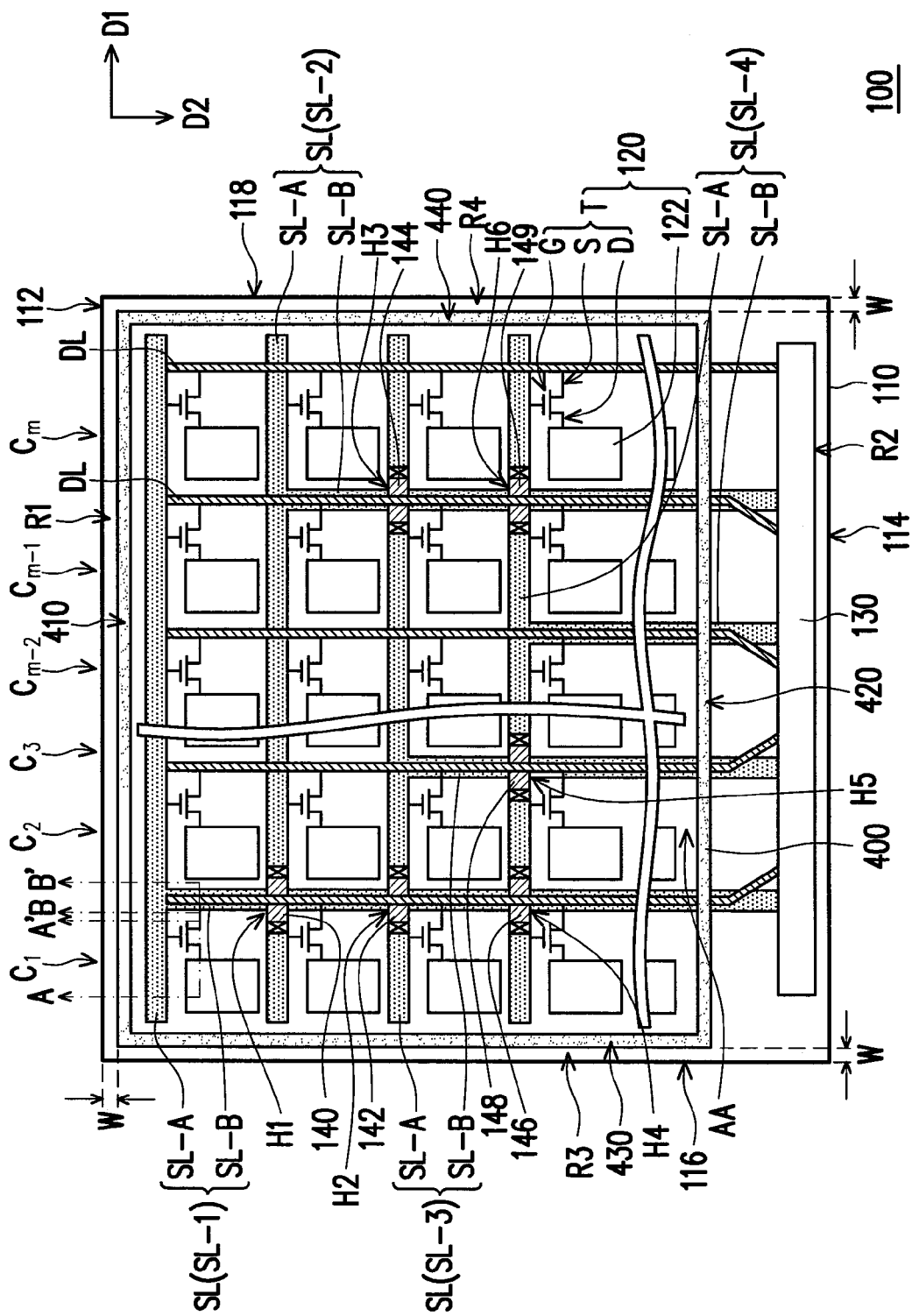
FIG. 3 is a top view of a first substrate of the display panel shown in FIG. 2.

FIG. 3 is a top view of the first substrate of the display panel shown in FIG. 2. It should be noted that FIG. 2 is the partially cross-sectional view of the display panel shown in FIG. 1 and taken along lines A-A' and B-B' shown in FIG. 3. Referring to FIG. 2 and FIG. 3, the first substrate 100 of the present embodiment includes a first substrate body 110, a plurality of pixel units 120, a plurality of data lines DL, a first insulation layer GI-1, and a plurality of scan lines SL. In the present embodiment, the first substrate body 110 may be a transparent plate. For example, the first substrate body 110 may be a glass plate. However, the disclosure is not limited thereto.

The pixel units 120 are arranged in an array on the first substrate body 110. In the present embodiment, each of the pixel units 120 of the present embodiment includes an active device T and a pixel electrode 122. Referring to FIG. 2 and FIG. 3, the active device T has a source S, a gate G, a channel CH, and a drain D electrically connecting to the pixel electrode 122. The source S of each active device T is electrically connected to one of the data lines DL. The gate G of each active device T is electrically connected to one of the scan lines SL. The active device T of the present embodiment may be a thin film transistor. However, the disclosure is not limited thereto.

The data lines DL are disposed on the first substrate body 110 and electrically connected to the pixel units 120. In detail, the data lines DL are electrically connected to the sources S of the active devices T of the pixel units 120. The scan lines SL are disposed on the first substrate body 110 and electrically connected to the pixel units 120. In detail, the scan lines SL are electrically connected to the gates G of the active devices T of the pixel units 120. In the present embodiment, the scan lines SL and data lines DL may belong to different layers. As shown in FIG. 2 and FIG. 3, the scan lines SL-1, SL-2 and the gates G of the active devices T may be disposed in the same layer. The data lines DL, the sources S, and the drains D may be disposed in the same layer. However, the disclosure is not limited thereto.

Referring to FIG. 3, especially, each of the scan lines SL has a first part SL-A and a second part SL-B electrically connecting to the first part SL-A. The first parts SL-A of the scan lines SL are interlaced with the data lines DL. In the present embodiment, the first part SL-A of the scan line SL and the data line DL may be perpendicular to each other. The second parts SL-B of the scan lines SL are substantially overlapped with the data lines DL with the first insulation layer GI-1 disposed therebetween. In detail, the second parts SL-B of the scan lines SL and the data lines DL are overlapped in an active area AA. By the second parts SL-B, the width W of border of the display panel 1000 may be reduced. The reason of reducing the width W of border of the display panel 1000 by the second parts SL-B will be illustrated as following paragraphs.

Referring to FIG. 2 and FIG. 3, the display panel 1000 further comprises an adhesive pattern 400. The display medium 300 and the pixel units 120 are surrounded by the adhesive pattern 400 between the first substrate 100 and the second substrate 200. All of the pixel units 120 are surrounded by the adhesive pattern 400. In the other word, the first substrate body 110 has an active area AA surrounded by the adhesive pattern 400. Most part of the scan lines SL and the data lines DL are also surrounded by the adhesive pattern 400.

The adhesive pattern 400 of the present embodiment has a first segment 410, a second segment 420 disposed opposite to the first segment 410, a third segment 430 connecting one end of the first segment 410 to one end of the second segment 420, and a fourth segment 440 disposed opposite to the third segment 430 and connecting the other end of the first segment 410 to the other end of the second segment 420. The first segment 410 and the second segment 420 are substantially parallel to the first parts SL-A of the scan lines SL. The third segment 430 and the fourth segment 440 are substantially parallel to the second parts SL-B of the scan lines SL.

The first substrate body 110 of the present embodiment has a first edge 112 substantially parallel and adjacent to the first segment 410, a second edge 114 substantially parallel and adjacent to the second segment 420, a third edge 116 substantially parallel and adjacent to the third segment 430, and a fourth edge 118 substantially parallel and adjacent to the fourth segment 440. In addition to the active area AA, the first substrate body 110 has a first peripheral area R1, a second peripheral area R2, a third peripheral area R3 and a fourth peripheral area R4. The first peripheral area R1 is defined between the first segment 410 of the adhesive pattern 400 and the first edge 112 of the first substrate body 110. The second peripheral area R2 is defined between the second segment 420 of the adhesive pattern 400 and the second edge 114 of the first substrate body 110. The third peripheral area R3 is defined between the third segment 430 of the adhesive pattern 400 and the third edge 116 of the first substrate body 110. A fourth peripheral area R4 is defined between the fourth segment 440 of the adhesive pattern 400 and the fourth edge 118 of the first substrate body 110.

The display panel 1000 of the present embodiment further comprises a driving unit 130 disposed outside the adhesive pattern 400. The driving unit 130 is electrically connected to the data lines DL and the scan lines SL for driving the plurality of pixel units 120. The driving unit 130 may drive the pixel units 120 by the data lines DL and the scan lines SL, so that the display panel 1000 can display an image. In the present embodiment, the driving unit 130 is disposed in the second peripheral area R2 of the first substrate body 110. In other embodiment of the present disclosure, the driving unit 130 may be disposed on a printed circuit board (PCB) of the electronic device 10000 and is electrically connected to the scan lines SL and the data lines DL via a flexible printed circuit (FPC) board (not shown). The second parts SL-B of the scan lines SL extend through the second segment 420 of the adhesive pattern 400 from the active area AA to the second peripheral area R2 for being electrically connected to the driving unit 130. In the present embodiment, the second parts SL-B of the scan lines SL only pass through the second segment 420 of the adhesive pattern 400 without passing through the first peripheral area R1, the third peripheral area R3 or the fourth peripheral area R4 for being electrically connected to the driving unit. In the other word, the first peripheral area R1, the third peripheral area R3 or the fourth peripheral area R4 do not have the scan lines SL disposed thereon. Thereby, the width W of border of the display panel 1000 may be obviously reduced, and a display panel 1000 having slim borders can be realized. However, in other embodiments, some of the scan lines SL may still extend from the active area AA to other peripheral area, for example, the first peripheral area R1, the third peripheral area R3 or the fourth peripheral area R4 while most of the second parts SL-B of the scan lines SL extend from the active area AA to the second peripheral area R2 whereby achieving the purpose of reducing the width W of borders of the display panel 1000. Therefore, the present embodiment shown in FIG. 3 is only to illustrate a best mode of the present disclosure, but the invention is not limited thereto.

Beside, in the present embodiment, the arrangement of the second parts SL-B of the scan lines SL doesn't excessively affect the transmittance of the display panel 1000 since the second parts SL-B of the scan lines SL and the data lines DL are overlapped. The optical performance of the display panel 1000 is still good.

Referring to FIG. 3, in the present embodiment, a number of the scan lines are p. The p is a natural number greater than one. The first part SL-A of each of the scan lines SL extends along a first direction D1. The second part SL-B of each of the scan lines SL extends along a second direction D2. The first direction D1 and the second direction D2 are interlaced with each other. In the present embodiment, the first direction D1 is substantially perpendicular to the second direction D2. The pixel units 120 are disposed in n rows along the first direction D1 and in m columns along the second direction D2. Herein, n and m is a natural number greater than one. The first part SL-A of each of the scan lines SL is electrically connected to each row of the pixel units 120. To be more specific, the first part SL-A of $1^{st}$ scan line SL-1 is electrically connected to $1^{st}$ row of the pixel units 120 (the top row of the pixel units 120). The first part SL-A of $2^{nd}$ scan line SL-2 is electrically connected to $2^{hd}$ row of the pixel units 120 (the second row from the top of the pixel units 120) and has a channel section H1 (as shown in FIG. 2 and FIG. 3). The first part SL-A of $3^{rd}$ scan line SL-3 is electrically connected to $3^{rd}$ row of the pixel units 120 (the third row from the top of the pixel units 120) and has two channel sections H2, H3. The first part SL-A of $4^{th}$ scan line SL-4 is electrically connected to $4^{th}$ row of the pixel units 120 (the fourth row from the top of the pixel units 120) and has three channel sections H4, H5 H6. The second part SL-B of $1^{st}$ scan line SL-1 is disposed between $1^{st}$ column $C_1$ of the pixel units 120 and $2^{hd}$ column $C_2$ of the pixel units 120 and extends through at least the channel sections H1, H2 and H4 without electrically connecting to the first part SL-A of $2^{nd}$ scan line SL-2, the first part SL-A of $3^{rd}$ scan line SL-3 and the first part SL-A of $4^{th}$ scan line SL-4. The second part SL-B of $2^{nd}$ scan line SL-2 is disposed between $m^{th}$ column C. of the pixel units 120 and $(m-1)^{th}$ column $C_{m-1}$ of pixel units 120 and extends through at least the channel sections H3 and H6 without electrically connecting to the first part SL-A of $3^{rd}$ scan line SL-3 and the first part SL-A of $4^{th}$ scan line SL-4. The second part SL-B of $3^{rd}$ scan line SL-3 is disposed between $2^{nd}$ column $C_2$ of the pixel units 120 and $3^{rd}$ column $C_3$ of the pixel units and extends through at least the channel section H5 without electrically connecting to the first part SL-A of $4^{th}$ scan line SL-4. The second part SL-B of $4^{th}$ scan line SL-4 is disposed between $(m-1)^{th}$ column $C_{m-1}$ of the pixel units 120 and $(m-2)^{th}$ column $C_{m-2}$ of the pixel units 120 and may extend through one or more channel sections of other scan lines not shown in FIG. 3. The locations of the second part SL-B of $5^{th}$~$n^{th}$ scan line SL-1 can be analogized by the same means as describe above. The display panel 1000 has a good electrical property by the arrangement of the second part SL-B as described above. Please note that, in this embodiment, the channel sections H2, H3, H4, H5 and H6 have a similar cross-sectional feature as the channel section H1 shown in FIG. 2.

Referring to FIG. 2 and FIG. 3, in the present embodiment, the first part SL-A of $1^{st}$ scan line SL-1 is electrically connected to the gates. G of the active devices T in the first row. The first part SL-A of $2^{nd}$ scan line SL-2 is electrically connected to the gates G of the active devices T in the second row and has two ends E1, E2 (denoted in FIG. 2) cut by the channel section H1 and a connecting element 140 electrically connecting the two ends E1, E2. The connecting element 140 crosses the second part SL-B of $1^{st}$ scan line SL-1 and covers the channel section H1. As shown in FIG. 3, similarly, the first part SL-A of $3^{rd}$ scan line SL-3 is electrically connected to the gates G of the active devices T in the third row and has two connecting elements 142 and 144. The connecting element 142 crosses the second part SL-B of $1^{st}$ scan line SL-1 and covers the channel section H2, and the connecting element 144 crosses the second part SL-B of $2^{nd}$ scan line SL-2 and covers the channel section H3. In addition, the first part SL-A of $4^{th}$ scan line SL-4 is electrically connected to the gates G of the active devices T in the fourth row and has three connecting elements 146, 148 and 149. The connecting element 146 crosses the second part SL-B of $1^{st}$ scan line SL-1 and covers the channel section H4; the connecting element 148 crosses the second part SL-B of $3^{rd}$ scan line SL-3 and covers the channel section H5; and the connecting element 149 crosses the second part SL-B of $2^{nd}$ scan line SL-2 and covers the channel section H6.

Referring to FIG. 2, in the present embodiment, the display panel 1000 further comprises a second insulation layer GI-2 disposed between the scan lines SL and the connecting elements 140, 142, 144, 146, 148, 149. The second insulation layer GI-2 makes the second part SL-B of the $1^{st}$ scan line SL-1 electrically insulate from the first part SL-A of the $2^{nd}$ scan line SL-2, the connecting element 140, the first part SL-A of the $3^{rd}$ scan line SL-3, the connecting element 142, the first part SL-A of the $4^{th}$ scan line SL-4 and the connecting element 146. Similarly, the second insulation layer GI-2 makes the second part SL-B of the $2^{nd}$ scan line SL-2 electrically insulate from the first part SL-A of the $3^{rd}$ scan line SL-3, the connecting element 144, the first part SL-A of the $4^{th}$ scan line SL-4 and the connecting element 149. Also, the second insulation layer GI-2 makes the second part SL-B of the $3^{rd}$ scan line SL-3 electrically insulate from the first part SL-A of the $4^{th}$ scan line SL-4 and the connecting element 148. The first insulation layer GI-1 is disposed between the data lines DL and the connecting element 140 and makes the scan line SL and the connecting element 140 electrically insulate from the data line DL. The electrical interference between the data lines DL and the scan line SL may be abated by increasing the thickness of the first insulation layer GI-1.

Referring to FIG. 2, the second substrate 200 is disposed opposite to the first substrate 100. The second substrate 200 of the present embodiment includes a second substrate body 210, a color filter layer 230 disposed on the second substrate body 210 and a conduction layer 220 disposed on the color filter layer 230. The conduction layer 220 and the pixel electrode 122 may drive the display medium 300, so that the display panel 1000 can display an image. In addition, the display panel 1000 can display a colorful image by the color filter layer 230.

According to the above disclosure, in the display panel of the exemplary embodiment, the second parts of the scan lines extend from the active area to the second peripheral area for being electrically connected to the driving unit. In the other word, the first peripheral area, the third peripheral area or the fourth peripheral area do not have spaces for disposing the scan lines. Thereby, the width of boarder of the display panel may be obviously reduced and a display panel having slim borders can be realized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
a housing; and
a display panel installed in the housing, comprising:
   a first substrate, comprising:
      a first substrate body;
      a plurality of pixel units, arranged in an array on the first substrate body;
      a plurality of data lines, disposed on the first substrate body and electrically connected to the pixel units;
      a first insulation layer;
      a plurality of scan lines, disposed on the first substrate body and electrically connected to the pixel units, each of the scan lines has a first part and a second part connecting to the first part, wherein the first parts of the scan lines are interlaced with the data lines and the second parts of the scan lines, and the second parts of the scan lines are substantially overlapped with the data lines with the first insulation layer disposed therebetween;
   a second substrate, disposed opposite to the first substrate; and
   a display medium, disposed between the first substrate and the second substrate.

2. The electronic device of claim 1, wherein the display panel further comprises: an adhesive pattern, wherein the display medium and the pixel units are surrounded by the adhesive pattern between the first substrate and the second substrate.

3. The electronic device of claim 2, wherein the adhesive pattern has a first segment, a second segment disposed opposite to the first segment, a third segment connecting one end of the first segment to one end of the second segment, and a fourth segment disposed opposite to the third segment and connecting the other end of the first segment to the other end of the second segment; the first substrate body has a first edge adjacent to the first segment, a second edge adjacent to the second segment, a third edge adjacent to the third segment, and a fourth edge adjacent to the fourth segment; the first substrate body has an active area surrounded by the adhesive pattern, a first peripheral area defined between the first segment of the adhesive pattern and the first edge of the first substrate body, a second peripheral area defined between the second segment of the adhesive pattern and the second edge of the first substrate body, a third peripheral area defined between the third segment of the adhesive pattern and the third edge of the first substrate body, and a fourth peripheral area defined between the fourth segment of the adhesive pattern and the fourth edge of the first substrate body.

4. The electronic device of claim 3, further comprising: a driving unit, disposed outside the adhesive pattern and electrically connected to the data lines and the scan lines for driving the plurality of pixel units, wherein the second parts of the scan lines extend through the second segment of the adhesive pattern from the active area to the second peripheral area for being electrically connected to the driving unit.

5. The electronic device of claim 4, wherein the second parts of the scan lines only pass through the second segment of the adhesive pattern without passing through the first peripheral area, the third peripheral area or the fourth peripheral area for being electrically connected to the driving unit.

6. The electronic device of claim 1, wherein a number of the scan lines are p, the first part of each of the scan lines extends along a first direction, the second part of each of the scan lines extends along a second direction, the first direction and the second direction are interlaced, and the pixel units are disposed in n rows along the first direction and in m columns along the second direction; and wherein the first part of each of the scan lines is electrically connected to each row of the pixel units.

7. The electronic device of claim 6, wherein the first part of $1^{st}$ scan line is electrically connected to $1^{st}$ row of the pixel units, and the first part of $2^{nd}$ scan line is electrically connected to $2^{nd}$ row of the pixel units and has a channel section; and wherein the second part of $1^{st}$ scan line extends through the channel section of the first part of $2^{nd}$ scan line without electrically connecting to the first part of $2^{nd}$ scan line and connects to the first part of $1^{st}$ scan line.

8. The electronic device of claim 7, wherein the first part of $2^{nd}$ scan line has two ends cut by the channel section and a first connecting element electrically connecting the two ends of the first part of $2^{nd}$ scan line.

9. The electronic device of claim 8, wherein the display panel further comprises: a second insulation layer, disposed between the scan lines and the first connecting element.

10. The electronic device of claim 8, wherein the first insulation layer is disposed between the data lines and the first connecting element.

11. The electronic device of claim 1, wherein each of the pixel units comprises an active device and a pixel electrode, the active device has a source, a gate, and a drain electrically connecting to the pixel electrode, the source of the active devices is electrically connected to one of the data lines, and the gate of the active devices is electrically connected to one of the scan lines.

12. The electronic device of claim 1, wherein the second substrate comprises a second substrate body; and a color filter layer disposed on the second substrate body.

13. The electronic device of claim 1, wherein the second substrate comprises a conduction layer disposed on the color filter.

14. The electronic device of claim 1, wherein the display medium is a liquid crystal layer.

* * * * *